United States Patent
Atarius et al.

(10) Patent No.: US 12,501,386 B2
(45) Date of Patent: Dec. 16, 2025

(54) FACTOR FOR MULTIPLE DEVICE REGISTRATIONS

(71) Applicant: Lenovo (Singapore) Pte. Ltd., New Tech Park (SG)

(72) Inventors: Roozbeh Atarius, La Jolla, CA (US); Andreas Kunz, Ladenburg (DE); Sheeba Backia Mary Baskaran, Friedrichsdorf (DE)

(73) Assignee: Lenovo (Singapore) Pte. Ltd., Singapore (SG)

(*) Notice: Subject to any disclaimer, the term of this patent is extended or adjusted under 35 U.S.C. 154(b) by 376 days.

(21) Appl. No.: 18/020,058

(22) PCT Filed: Aug. 6, 2021

(86) PCT No.: PCT/IB2021/057235
§ 371 (c)(1),
(2) Date: Feb. 6, 2023

(87) PCT Pub. No.: WO2022/029701
PCT Pub. Date: Feb. 10, 2022

(65) Prior Publication Data
US 2023/0309044 A1    Sep. 28, 2023

Related U.S. Application Data

(60) Provisional application No. 63/063,814, filed on Aug. 10, 2020, provisional application No. 63/062,397, filed on Aug. 6, 2020.

(51) Int. Cl.
*H04W 60/04* (2009.01)
*H04W 76/10* (2018.01)

(52) U.S. Cl.
CPC .......... *H04W 60/04* (2013.01); *H04W 76/10* (2018.02)

(58) Field of Classification Search
None
See application file for complete search history.

(56) References Cited

U.S. PATENT DOCUMENTS

2003/0179762 A1    9/2003    Isomakl et al.
2007/0217418 A1    9/2007    Baker et al.
(Continued)

FOREIGN PATENT DOCUMENTS

WO    2011109722 A1    9/2011

OTHER PUBLICATIONS

PCT/IB2021/057235, "Notification of Transmittal of the International Search Report and the Written Opinion of the International Searching Authority, or the Declaration", International Searching Authority, Nov. 12, 2021, pp. 1-15.
(Continued)

*Primary Examiner* — Otis L Thompson, Jr.
(74) *Attorney, Agent, or Firm* — Kunzler Bean & Adamson

(57) ABSTRACT

Apparatuses, methods, and systems are disclosed for a factor for multiple device registrations. One method includes receiving, at a network device from a first device, a first session initiation protocol message including an identity for establishing a data session. The method includes determining a factor based on a first registration performed by a second device and a second registration performed by a third device. The method includes transmitting a second session initiation protocol message including the identity and the factor to the second device. The method includes establishing the data session between the first device and the second device. The identity is: registered for the first registration; registered for the second registration; not registered for the first registration; not registered for the second registration; or some combination thereof.

19 Claims, 13 Drawing Sheets

(56) References Cited

U.S. PATENT DOCUMENTS

| | | | |
|---|---|---|---|
| 2010/0246444 A1* | 9/2010 | Witzel | H04L 65/1095 370/255 |
| 2011/0106971 A1* | 5/2011 | Siegel | H04L 65/1053 709/238 |
| 2020/0187059 A1* | 6/2020 | Milko | H04L 65/1104 |

OTHER PUBLICATIONS

Rosenberg et al., "SIP: Session Initiation Protocol", Network Working Group RFC-3261, The Internet Society, Jun. 2020, pp. 1-269.

Rosenberg et al., "Caller Preferences for the Session Initiation Protocol (SIP)", Network Working Group RFC-3841, The Internet Society, Aug. 2004, pp. 1-26.

Jennings et al., "Managing Client-Initiated Connections in the Session Initiation Protocol (SIP)", Network Working Group RFC-5626, The Internet Society, Oct. 2009, pp. 1-50.

Rosenberg, "Obtaining and Using Globally Routable User Agent URIs (GRUUs) in the Session Initiation Protocol (SIP)", Network Working Group RFC-5627, The Internet Society, Oct. 2009, pp. 1-40.

Montemurro et al., "A Uniform Resource Name Namespace for the Global System for Mobile Communications Association (GSMA) and the International Mobile station Equipment Identity (IMEI)", Internet Engineering Task Force (IETF) RFC-7254, May 2014, pp. 1-16.

Jesske et al., "Private Header (P-Header) Extensions to the Session Initiation Protocol (SIP) for the 3GPP", Internet Engineering Task Force (IETF) RFC-7315, Jul. 2014, pp. 1-43.

3GPP, "3rd Generation Partnership Project; Technical Specification Group Core Network and Terminals; Support of multi-device and multi-identity in the IP Multimedia Subsystem (IMS); Stage 3 (Release 16)", 3GPP TS 24.174 V16.1.0, Jun. 2020, pp. 1-32.

3GPP, "3rd Generation Partnership Project; Technical Specification Group Radio Access Network; NR; Radio Resource Control (RRC) protocol specification (Release 16)", 3GPP TS 38.331 V16.1.0, Jul. 2020, pp. 1-906.

3GPP, "3rd Generation Partnership Project; Technical Specification Group Core Network and Terminals; IP multimedia call control protocol based on Session Initiation Protocol (SIP) and Session Description Protocol (SDP); Stage 3 (Release 16)", 3GPP TS 24.229 V16.6.0, Jun. 2020, pp. 1-1067.

* cited by examiner

FACTOR FOR MULTIPLE DEVICE REGISTRATIONS

CROSS-REFERENCE TO RELATED APPLICATIONS

This application claims priority to U.S. Patent Application Ser. No. 63/062,397 entitled "APPARATUSES, METHODS, AND SYSTEMS FOR REACHING A UE WITH SHARED IDENTITY IN MULTIPLE DEVICES AND MULTIPLE IDENTITIES SERVICES" and filed on Aug. 6, 2020 for Roozbeh Atarius, and to U.S. Patent Application Ser. No. 63/063,814 entitled "APPARATUSES, METHODS, AND SYSTEMS FOR REACHING A UE WITH SHARED IDENTITY IN MULTIPLE DEVICES AND MULTIPLE IDENTITIES SERVICES" and filed on Aug. 10, 2020 for Roozbeh Atarius, all of which are incorporated herein by reference in their entirety.

FIELD

The subject matter disclosed herein relates generally to wireless communications and more particularly relates to a factor for multiple device registrations.

BACKGROUND

In certain wireless communications networks, multiple user devices may be linked together. In such networks, both user devices may receive notifications and/or phone calls.

BRIEF SUMMARY

Methods for a factor for multiple device registrations are disclosed. Apparatuses and systems also perform the functions of the methods. One embodiment of a method includes receiving, at a network device from a first device, a first session initiation protocol message including an identity for establishing a data session. In some embodiments, the method includes determining a factor based on a first registration performed by a second device and a second registration performed by a third device. In certain embodiments, the method includes transmitting a second session initiation protocol message including the identity and the factor to the second device. In various embodiments, the method includes establishing the data session between the first device and the second device. In some embodiments, the identity is: registered for the first registration; registered for the second registration; not registered for the first registration; not registered for the second registration; or some combination thereof.

One apparatus for a factor for multiple device registrations includes a network device. In some embodiments, the apparatus includes a receiver that receives, from a first device, a first session initiation protocol message including an identity for establishing a data session. In various embodiments, the apparatus includes a processor that determines a factor based on a first registration performed by a second device and a second registration performed by a third device. In certain embodiments, the apparatus includes a transmitter that transmits a second session initiation protocol message including the identity and the factor to the second device. In some embodiments, the processor establishes the data session between the first device and the second device. In various embodiments, the identity is: registered for the first registration; registered for the second registration; not registered for the first registration; not registered for the second registration; or some combination thereof.

Another embodiment of a method for a factor for multiple device registrations includes performing, by a second device, a first registration with a network. In some embodiments, the method includes receiving, at the second device and from the network, a second session initiation protocol message including an identity and a factor. The identity is part of a first session initiation protocol message from a first device for establishing a data session, and the factor is determined based on the first registration and a second registration performed by a third device. In certain embodiments, the method includes establishing the data session between the first device and the second device.

Another apparatus for a factor for multiple device registrations includes a second device. In some embodiments, the apparatus includes a processor that performs a first registration with a network. In various embodiments, the apparatus includes a receiver that receives, from the network, a second session initiation protocol message including an identity and a factor. The identity is part of a first session initiation protocol message from a first device for establishing a data session, and the factor is determined based on the first registration and a second registration performed by a third device. In certain embodiments, the processor establishes the data session between the first device and the second device.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
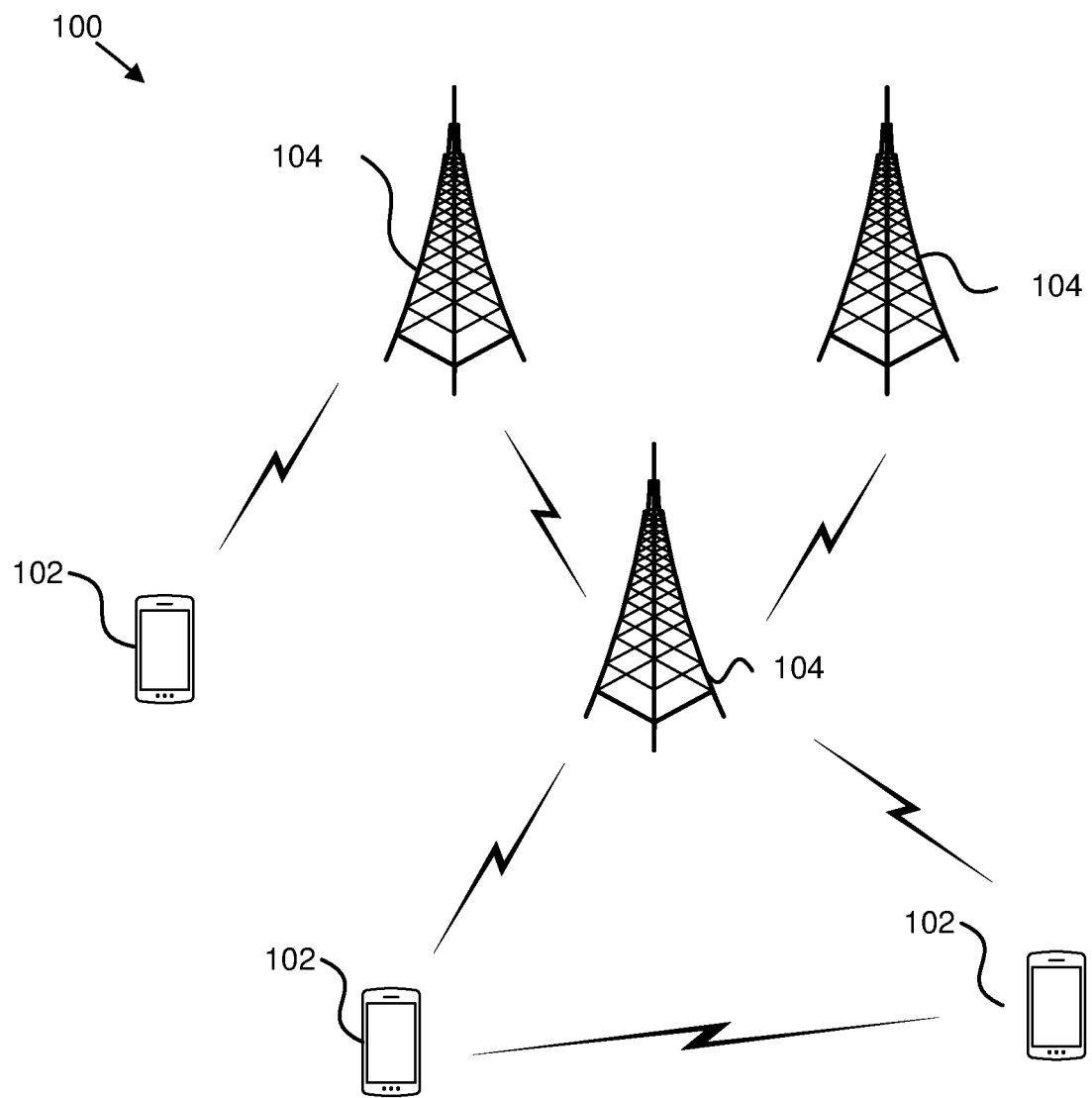
FIG. 1 is a schematic block diagram illustrating one embodiment of a wireless communication system for a factor for multiple device registrations.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for a factor for multiple device registrations. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to and/or may include one or more of an access point, an access terminal, a base, a base station, a location server, a core network ("CN"), a radio network entity, a Node-B, an evolved node-B ("eNB"), a 5G node-B ("gNB"), a Home Node-B, a relay node, a device, a core network, an aerial server, a radio access node, an access point ("AP"), new radio ("NR"), a network entity, an access and mobility management function ("AMF"), a unified data management ("UDM"), a unified data repository ("UDR"), a UDM/UDR, a policy control function ("PCF"), a radio access network ("RAN"), a network slice selection function ("NSSF"), an operations, administration, and management ("OAM"), a session management function ("SMF"), a user plane function ("UPF"), an application function, an authentication server function ("AUSF"), security anchor functionality ("SEAF"), trusted non-3GPP gateway function ("TNGF"), or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in third generation partnership project ("3GPP"), wherein the network unit 104 transmits using an OFDM modulation scheme on the downlink ("DL") and the remote units 102 transmit on the uplink ("UL") using a single-carrier frequency division multiple access ("SC-FDMA") scheme or an orthogonal frequency division multiplexing ("OFDM") scheme. More generally, however, the wireless communication system 100 may implement some other open or proprietary communication protocol, for example, WiMAX, institute of electrical and electronics engineers ("IEEE") 802.11 variants, global system for mobile communications ("GSM"), general packet radio service ("GPRS"), universal mobile telecommunications system ("UMTS"), long term evolution ("LTE") variants, code division multiple access 2000 ("CDMA2000"), Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a network unit 104 may receive, at a network device from a first device, a first session initiation protocol message including an identity for establishing a data session. In some embodiments, the network unit 104 may determine a factor based on a first registration performed by a second device and a second registration performed by a third device. In certain embodiments, the network unit 104 may transmit a second session initiation protocol message including the identity and the factor to the second device. In various embodiments, the network unit 104 may establish the data session between the first device and the second device. In some embodiments, the identity is: registered for the first registration; registered for the second registration; not registered for the first registration; not registered for the second registration; or some combination thereof. Accordingly, the network unit 104 may be used for a factor for multiple device registrations.

In certain embodiments, a network unit 104 may perform, by a second device, a first registration with a network. In some embodiments, the network unit 104 may receive, at the second device and from the network, a second session initiation protocol message including an identity and a factor. The identity is part of a first session initiation protocol message from a first device for establishing a data session, and the factor is determined based on the first registration and a second registration performed by a third device. In certain embodiments, the network unit 104 may establish the data session between the first device and the second device. Accordingly, the network unit 104 may be used for a factor for multiple device registrations.

Figure 2:
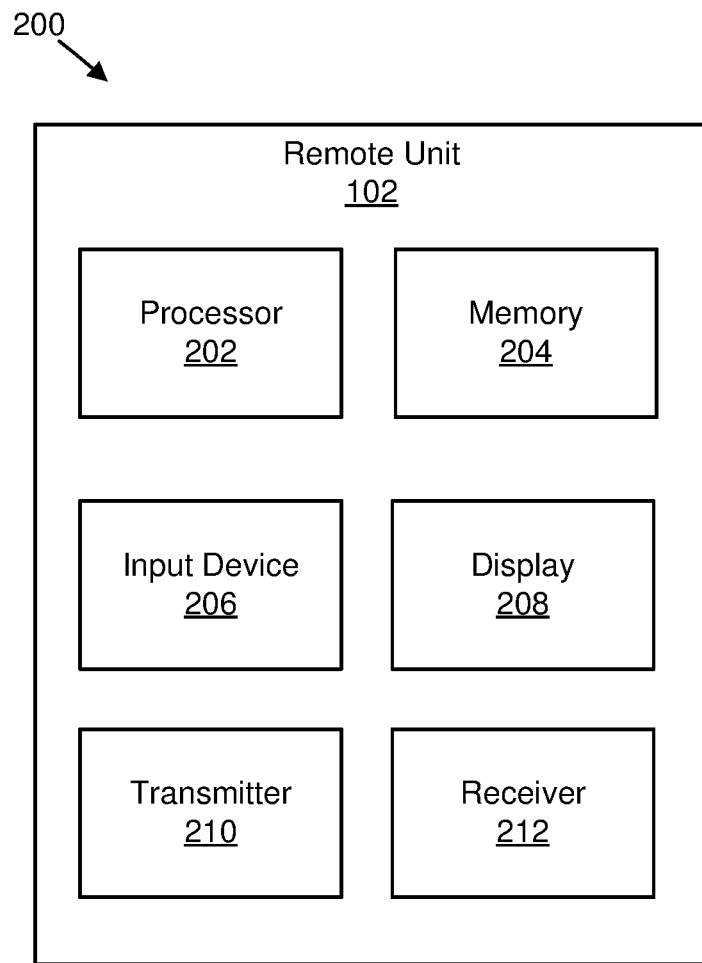
FIG. 2 is a schematic block diagram illustrating one embodiment of an apparatus that may be used for a factor for multiple device registrations.

FIG. 2 depicts one embodiment of an apparatus 200 that may be used for a factor for multiple device registrations. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, a liquid crystal display ("LCD"), a light emitting diode ("LED") display, an organic light emitting diode ("OLED") display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
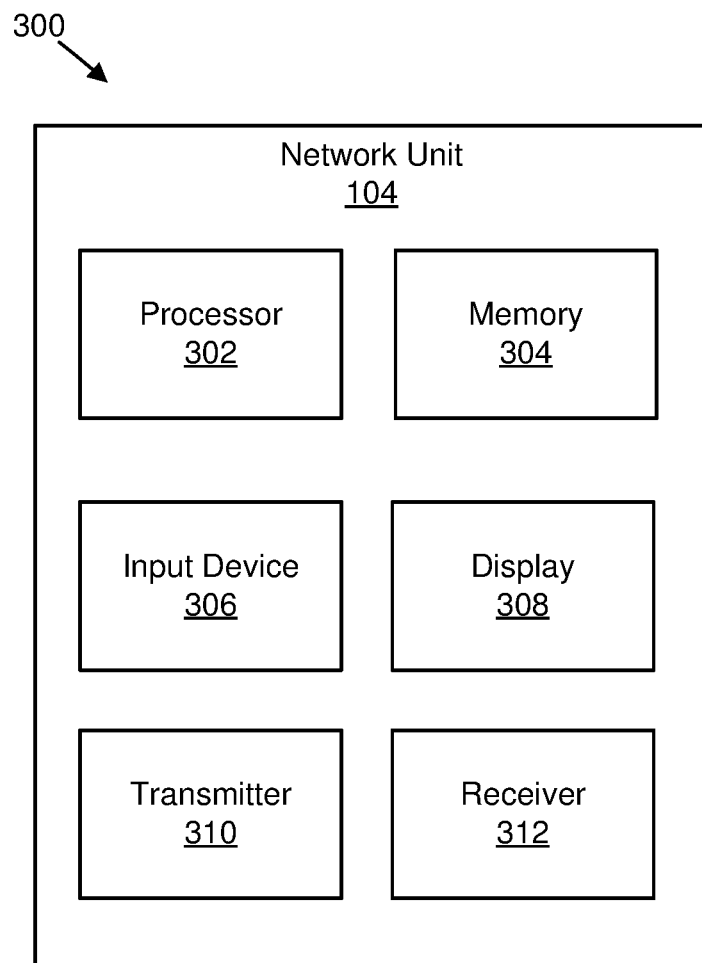
FIG. 3 is a schematic block diagram illustrating one embodiment of an apparatus that may be used for a factor for multiple device registrations.

FIG. 3 depicts one embodiment of an apparatus 300 that may be used for a factor for multiple device registrations. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In certain embodiments, the receiver 312 receives, from a first device, a first session initiation protocol message including an identity for establishing a data session. In various embodiments, the processor 302 determines a factor based on a first registration performed by a second device and a second registration performed by a third device. In certain embodiments, the transmitter 310 transmits a second session initiation protocol message including the identity and the factor to the second device. In some embodiments, the processor 302 establishes the data session between the first device and the second device. In various embodiments, the identity is: registered for the first registration; registered for the second registration; not registered for the first registration; not registered for the second registration; or some combination thereof.

In some embodiments, the processor 302 performs a first registration with a network. In various embodiments, the receiver 312 receives, from the network, a second session initiation protocol message including an identity and a factor. The identity is part of a first session initiation protocol message from a first device for establishing a data session, and the factor is determined based on the first registration and a second registration performed by a third device. In certain embodiments, the processor 302 establishes the data session between the first device and the second device.

In certain embodiments, such as in multiple devices and multiple identities services, several user equipments ("UEs") with different internet protocol ("IP") multimedia subsystem ("IMS") subscriptions and international mobile subscriber identities ("IMSIs") may have the same identities. Since all the UEs may be alerted due to the shared identity and/or address-of-record ("AOR"), a user may not be able to configure which UE should be alerted. In such embodiments, a user having two devices may like to have one device with him while doing some activity, but may wish to not get alerted on the device that the user has with him. Specifically, the user may be able to control when a terminating call is for that user.

In some embodiments, an identity used by a user (e.g., user-B) is native or non-native. If the identity is native, then the identity belongs to the same IMSI and the same IMS registration.

Figure 4:
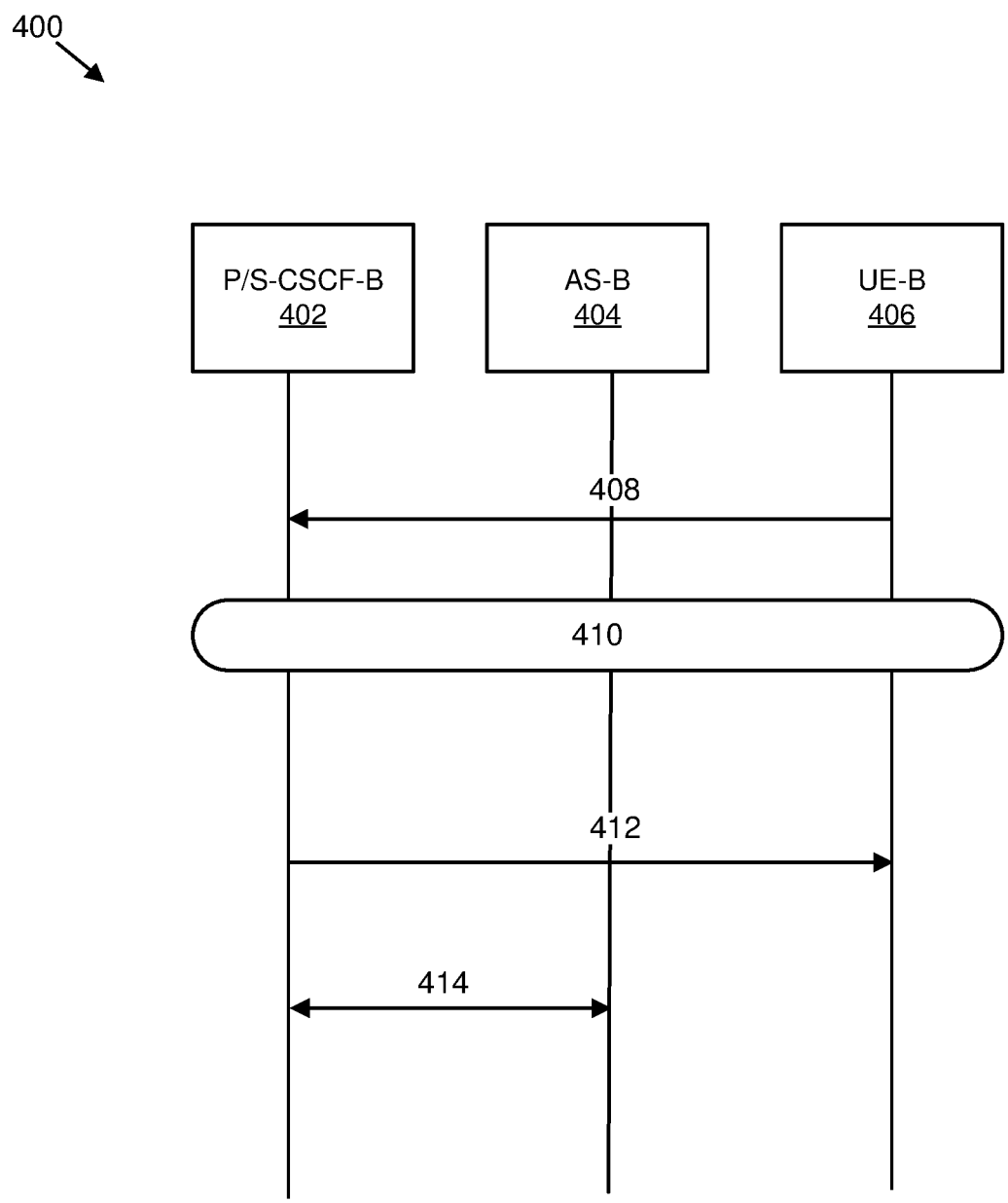
FIG. 4 is a schematic block diagram illustrating one embodiment of communications in a system having a native UE.

FIG. 4 is a schematic block diagram illustrating one embodiment of communications in a system 400 having a native UE. Specifically, the system 400 includes a proxy ("P")/serving ("S") call session control function ("CSCF") B ("P/S-CSCF-B") 402, an application server ("AS") B ("AS-B") 404, and a UE B ("UE-B") 406. As may be appreciated, each of the communications in the system 400 may include one or more messages.

In a first communication 408, the UE-B 406 transmits a registration message (e.g., including To:B; Contact: UE contact) to the P/S-CSCF-B 402. In a second communication 410, possible authentication challenge messages are communicated. In a third communication 412, the P/S-CSCF-B 402 transmits a registration response message (e.g., including 200 OK; Contact: UE contact; C; expires=3600) to the UE-B 406. In a fourth communication 414, 3rd party registration occurs between the P/S-CSCF-B 402 and the AS-B 404.

Specifically, FIG. 4 shows an embodiment in which the identity is native with the registration of UE-B 406 having identity B. A contact header field may include other capabilities for UE-B 406, such as methods and class. UE-B 406 may be allowed to use identity C which the UE receives in the contact header field of the 200 OK response.

Figure 5:
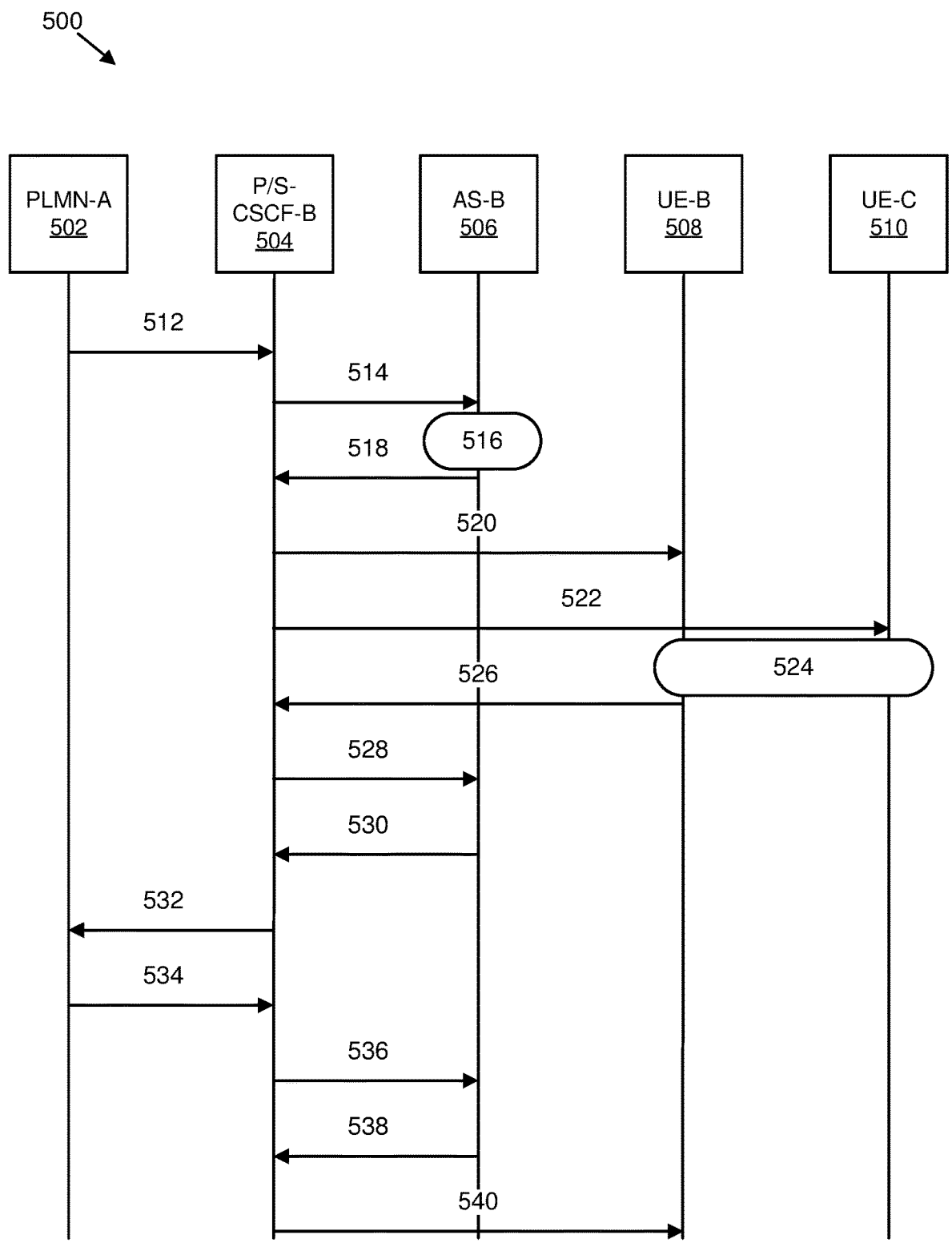
FIG. 5 is a schematic block diagram illustrating another embodiment of communications in a system having a native UE.

In some embodiments, if an INVITE is sent by a UE-A to a UE-B (e.g., shown in FIG. 5). User B has two devices, one for identity B which is registered against the UE contact at the time of registration and the other one for identity C which may be used against a UE contact as was received in a SIP 200 (OK) response of a REGISTER message.

FIG. 5 is a schematic block diagram illustrating another embodiment of communications in a system having a native UE. Specifically, the system 500 includes a public land mobile network ("PLMN") A ("PLMN-A") 502, a P/S-CSCF-B 504, an AS-B 506, a UE-B 508, and a UE C ("UE-C") 510. As may be appreciated, each of the communications in the system 500 may include one or more messages.

In a first communication 512, P/S-CSCF-B 504 receives a SIP INVITE from PLMN-A 502. The SIP INVITE request contains Request-URI identifying user B as B-native (e.g., including INVITE B; From: A; P-Asserted-Identity:A).

In a second communication 514, P/S-CSCF-B 504 forwards the SIP INVITE to the AS-B 506.

Upon receipt of the SIP INVITE request, the AS-B 506 determines 516 that the request is for UE-B 508 for which the identity B corresponds in Request-URI.

In a Third Communication 518, the AS-B 506 Forwards the SIP INVITE Request Towards the P/S-CSCF-B 504.

In a fourth communication 520 and a fifth communication 522, if the capability of UE contact allows, the P/S-CSCF-B 504 replaces the Request-URI with the UE contact and adds a P-Called-Party-ID header field set to identity B. The P/S-CSCF-B 504 forwards the SIP INVITE request towards the UE contact which are UE-B 508 with the identity B and UE-C 510 with identity C.

If the capability of UE contact does not allow, the P/S-CSCF-B 508 terminates the session establishment and sends a response with an appropriate error code towards PLMN-A 502. In some embodiments, UE-B 508 or UE-C 510 may have added a class set to business or methods other than INVITE to the contact header field at the time of registration. These capabilities may not match with the caller preference in the SIP INVITE request.

In a fifth communication 524, the UE-B 508 internally realizes that the call is for B identity due to P-Called-Party-ID, so UE-C 510 having identity C ignores it.

In a sixth communication 526, the P-Called-Party-ID header field is set to identity B and due to an implementation issue, even if the contact is the same in both devices, the device marked as UE-B 508 with the identity B sends SIP 200 (OK) response towards the P/S-CSCF-B 504.

In a seventh communication 528, the P/S-CSCF-B 504 forwards the SIP 200 (OK) response to AS-B 506.

In an eighth communication 530, the AS-B 506 forwards the SIP 200 (OK) response to the P/S-CSCF-B 504.

In a ninth communication 532, the P/S-CSCF-B 504 forwards the SIP 200 OK response to the PLMN-A 502.

In a tenth communication 534, the P/S-CSCF-B 504 receives a SIP acknowledgment ("ACK") request from the PLMN-A 502.

In an eleventh communication 536, the P/S-CSCF-B 504 forwards the SIP ACK request to the AS-B 506.

In a twelfth communication 538, the AS-B 506 forwards the SIP ACK request to the P/S-CSCF-B 504.

In a thirteenth communication 540, the P/S-CSCF-B 504 forwards the SIP ACK request to the UE-B 508.

Figure 6:
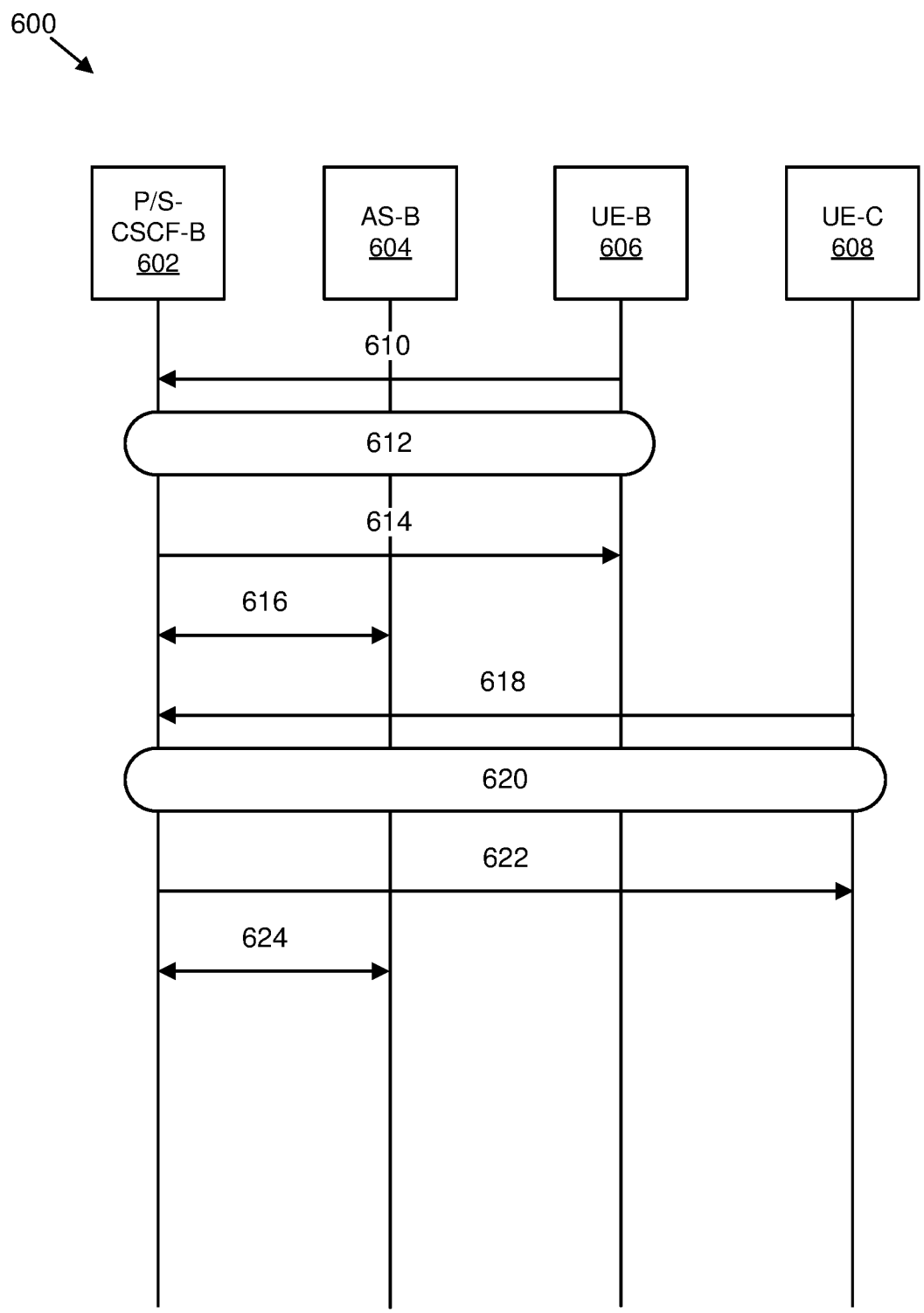
FIG. 6 is a schematic block diagram illustrating a further embodiment of communications in a system having a native UE.

FIG. 6 is a schematic block diagram illustrating a further embodiment of communications in a system 600 having a native UE. Specifically, the system 600 includes a P/S-CSCF-B 602, an AS-B 604, a UE-B 606, and a UE-C 608. As may be appreciated, each of the communications in the system 600 may include one or more messages.

Specifically, FIG. 6 shows another embodiment in which the identity is native with the registration of UE-B 606 with identity B. UE-B 606 is also allowed to use identity C which the UE receives in a contact header field of a 200 OK response.

In a first communication 610, a first device (UE-B 606) registers contact with the identity B with an instance-id with a q-value chosen to q1 with a message sent to P/S-CSCF-B 602. The contact header field may also include some capabilities for UE-B, such as methods and class (e.g., To: B; Supported: gruu; Contact: UE contact; reg-id; +sip.instance; q-value). In this registration, reg-id1 may be used to identify the registration for a flow.

In a second communication 612, the network may challenge the registration and if the authentication is successful, then in a third communication 614, the P/S-CSCF-B 602 (e.g., network) may send in the contact header of 200 OK to the UE-B 606, the instance of the contact, pub-gruu, temp-gruu, reg-id, the q-value to confirm the requested q-value, identity C which can also be used by this contact and the expire parameter to indicate when the instance of the contact is expired (e.g., To: B; Contact: UE contact; pub-gruu="B; gr-UUID"; temp-gruu="tempURI;gr"; +sip.instance; q-value; C; expires=3600).

In a fourth communication 616, the P/S-CSCF-B 602 performs 3rd party registration on behalf of the UE-B 606.

In a fifth communication 618, the second device (UE-C 608) may use the identity C with another instance-id with a q-value chosen to q2. The contact header field may also include some capabilities for UE-C 608, such as methods and class (e.g., To: C; Supported: gruu; Contact: UE contact; reg-id; +sip.instance; q-value). In this registration, reg-id2 may be used to identify the registration for another flow.

In a sixth communication 620, the network may challenge the registration, and if the authentication is successful, then in a seventh communication 622, the P/S-CSCF-B 602 (e.g., network) may send in the contact header of 200 OK, the instance of the contact, pub-gruu, temp-gruu, reg-id, the q-value to confirm the requested q-value, identity B and the expire parameter to indicate when the instance of the contact is expired (e.g., To: C; Contact: UE contact; pub-gruu="B; gr-UUID"; temp-gruu="tempURI;gr"; +sip.instance; q-value; B; expires=3600).

In an eighth communication 624, the P/S-CSCF-B 602 performs 3rd party registration on behalf of the UE-C 608.

Figure 7:
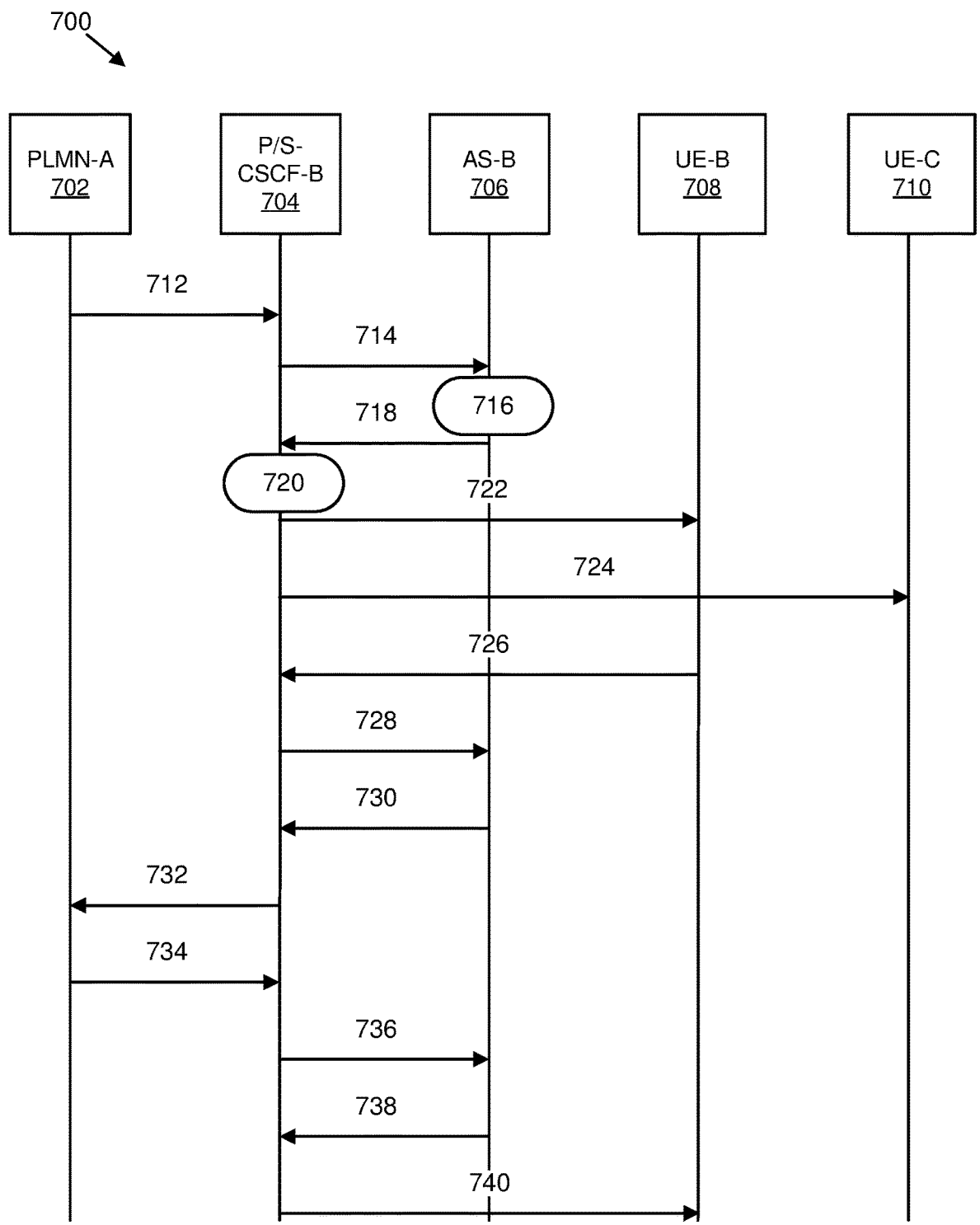
FIG. 7 is a schematic block diagram illustrating yet another embodiment of communications in a system having a native UE.

An INVITE may be sent by UE-A towards UE-B as shown in FIG. 7. User B as shown has two devices—one for identity B which is registered against the UE contact instance 1 and the other one for identity C which is registered against the UE contact instance 2.

FIG. 7 is a schematic block diagram illustrating yet another embodiment of communications in a system 700 having a native UE. Specifically, the system 700 includes a PLMN-A 702, a P/S-CSCF-B 704, an AS-B 706, a UE-B 708 (e.g., instance 1), and a UE-C 710 (e.g., instance 2). As may be appreciated, each of the communications in the system 700 may include one or more messages.

In a first communication 712, P/S-CSCF-B 704 receives a SIP INVITE from PLMN-A 702. The SIP INVITE request contains Request-URI identifying user B as B-native (e.g., including INVITE B; From: A; P-Preferred-Identity:A).

In a second communication 714, P/S-CSCF-B 704 forwards the SIP INVITE to the AS-B 706.

Upon receipt of the SIP INVITE request, the AS-B 706 determines 716 that the request is for UE-B 708 for which the identity B corresponds in Request-URI.

In a third communication 718, the AS-B 706 forwards the SIP INVITE request towards the P/S-CSCF-B 704.

UE-B 708 and UE-C 710 are registered 720 with the same contact but different instances, identities, and reg-ids. The instances of the contact have q-values q1 and q2 at the time of registration.

In a fourth communication 722 and a fifth communication 724, if the capability of UE contact instance 1 allows, the P/S-CSCF-B 704 may populate one SIP INVITE request by replacing the Request-URI with the UE contact instance 1 with the registered identity B and sending the SIP INVITE request only to that instance of the UE (e.g., UE-B 708). The P/S-CSCF-B 704 may add the P-Called-Party-ID header field set to identity B to the SIP INVITE request.

If the capability of UE contact instance 2 allows, the P/S-CSCF-B 704 may behave by populating two SIP INVITE requests, one targeted to UE-B 708 with the P-Called-Part-ID header field set to B is added and the other one to UE-C 710 with the P-Called-Party-ID header field set to B is added as well. This behavior may be due to the fact that both identities are associated identities which are registered for the UE contact. Due to the registered q-values for the instances of the UE contact, the SIP INVITE request may be sent simultaneously or at different times towards the UE-B 708 and the UE-C 710. This may provide a forking functionality (e.g., the SIP INVITE request is sent towards both devices which may be simultaneously or at different times depending on the registered q-values for the instances of the contact). The q-values are between 0 and 1 with a higher number indicating earlier transmissions than lower numbers. A certain q-value such as a zero value may be for not transmitting the SIP INVITE request towards the device with that zero q-value registered for the instance of the contact.

If the capability of UE contact instance 1 and instance 2 does not allow, the P/S-CSCF-B 704 terminates the session establishment and sends a response with an appropriate error cause towards PLMN-A 702. UE-B 708 or UE-C 710 may have added a class set to business or methods other than INVITE to the contact header field at the time of registration. These capabilities may not match with the caller preference in the SIP INVITE request.

In a sixth communication 726, the UE-B 708 sends a SIP 200 (OK) response towards the P/S-CSCF-B 704.

In a seventh communication 728, the P/S-CSCF-B 704 forwards the SIP 200 (OK) response to the AS-B 706.

In an eighth communication 730, the AS-B 706 forwards the SIP 200 (OK) response to the P/S-CSCF-B 704.

In a ninth communication 732, the P/S-CSCF-B 704 forwards the SIP 200 OK response to the PLMN-A 702.

In a tenth communication 734, the P/S-CSCF-B 704 receives a SIP ACK request from the PLMN-A 702.

In an eleventh communication 736, the P/S-CSCF-B 704 forwards the SIP ACK request to the AS-B 706.

In a twelfth communication 738, the AS-B 706 forwards the SIP ACK request to the P/S-CSCF-B 704.

In a thirteenth communication 740, the P/S-CSCF-B 704 forwards the SIP ACK request to the UE-B 708.

Figure 8:
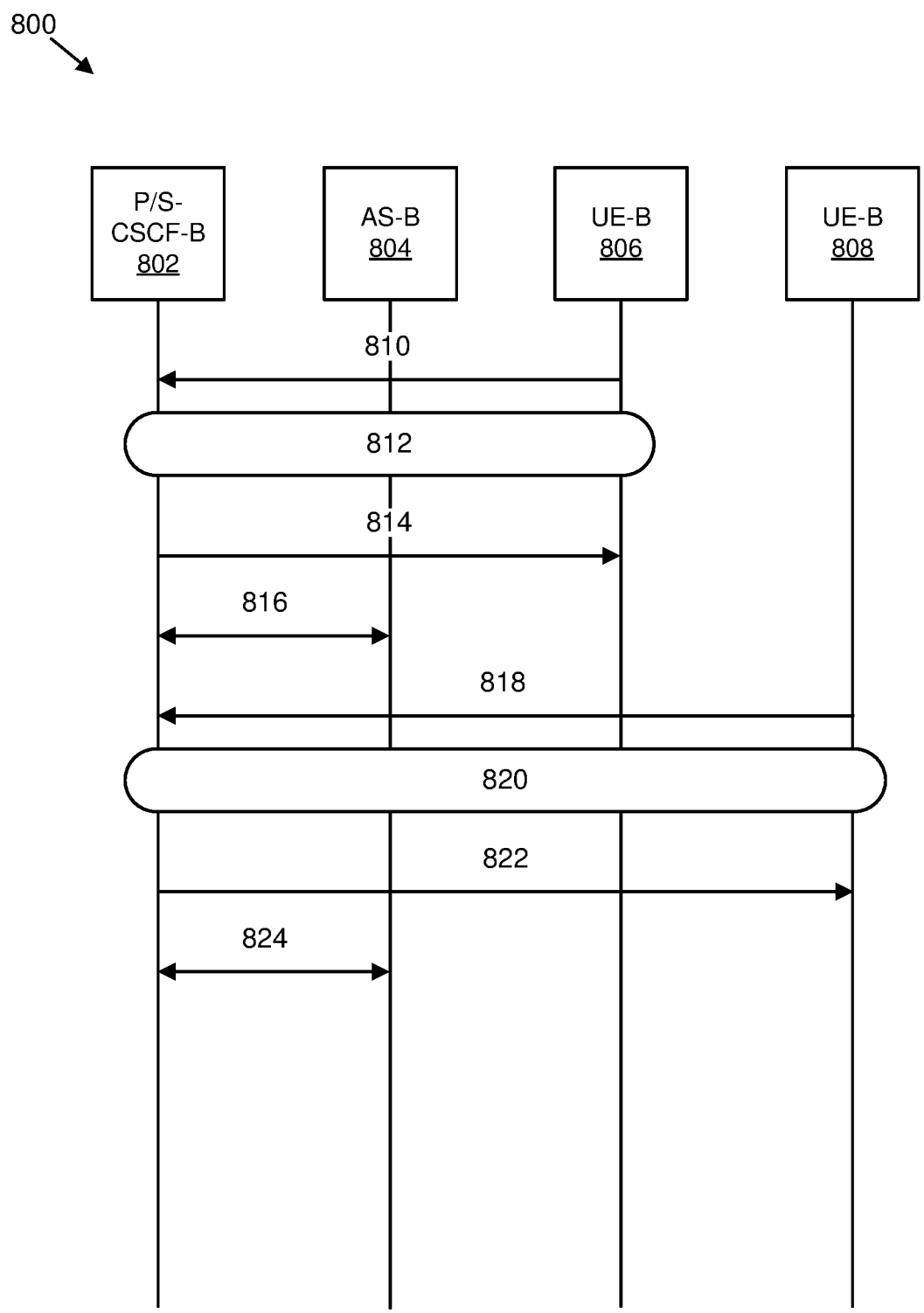
FIG. 8 is a schematic block diagram illustrating another embodiment of communications in a system having a native UE.

The instances of the UE contact may register the same identity B and receive the native identity C in the SIP 200 (OK) response if the registrations are successful as shown in FIG. 8.

FIG. 8 is a schematic block diagram illustrating another embodiment of communications in a system 800 having a native UE. Specifically, the system 800 includes a P/S-CSCF-B 802, an AS-B 804, a UE-B 806, and a UE-B 808. As may be appreciated, each of the communications in the system 800 may include one or more messages.

In a first communication 810, a first device (UE-B 806) registers contact with the identity B with an instance-id with a q-value chosen to q1 with a message sent to P/S-CSCF-B 802. The contact header field may also include some capabilities for this instance of UE-B 806, such as methods and class (e.g., To: B; Supported: gruu; Contact: UE contact; reg-id; +sip.instance; q-value). In this registration, reg-id1 may be used to identify the registration for a flow.

In a second communication 812, the network may challenge the registration and if the authentication is successful, then in a third communication 814, the P/S-CSCF-B 802 (e.g., network) may send in the contact header of 200 OK to the UE-B 806, the instance of the contact, pub-gruu, temp-gruu, reg-id, the q-value to confirm the requested q-value, identity C which can also be used by this contact and the expire parameter to indicate when the instance of the contact is expired (e.g., To: B; Contact: UE contact; pub-gruu="B; gr-UUID"; temp-gruu="tempURI;gr"; +sip.instance; q-value; C; expires=3600).

In a fourth communication 816, the P/S-CSCF-B 802 performs 3rd party registration on behalf of the UE-B 806.

In a fifth communication 818, the second device (UE-B 808) may use the identity B with another instance-id with a q-value chosen to q2. The contact header field may also include some capabilities for the instance of the UE (UE-B 808) such as methods and class (e.g., To: B; Supported: gruu; Contact: UE contact; reg-id; +sip.instance; q-value). In this registration, reg-id2 may be used to identify the registration for another flow.

In a sixth communication 820, the network may challenge the registration, and if the authentication is successful, then in a seventh communication 822, the P/S-CSCF-B 802 (e.g., network) may send in the contact header of 200 OK, the instance of the contact, pub-gruu, temp-gruu, reg-id, the q-value to confirm the requested q-value, identity B and the expire parameter to indicate when the instance of the contact is expired (e.g., To: B; Contact: UE contact; pub-gruu="B; gr-UUID"; temp-gruu="tempURI;gr"; +sip.instance; q-value; C; expires=3600).

In an eighth communication 824, the P/S-CSCF-B 802 performs 3rd party registration on behalf of the UE-B 808.

Figure 9:
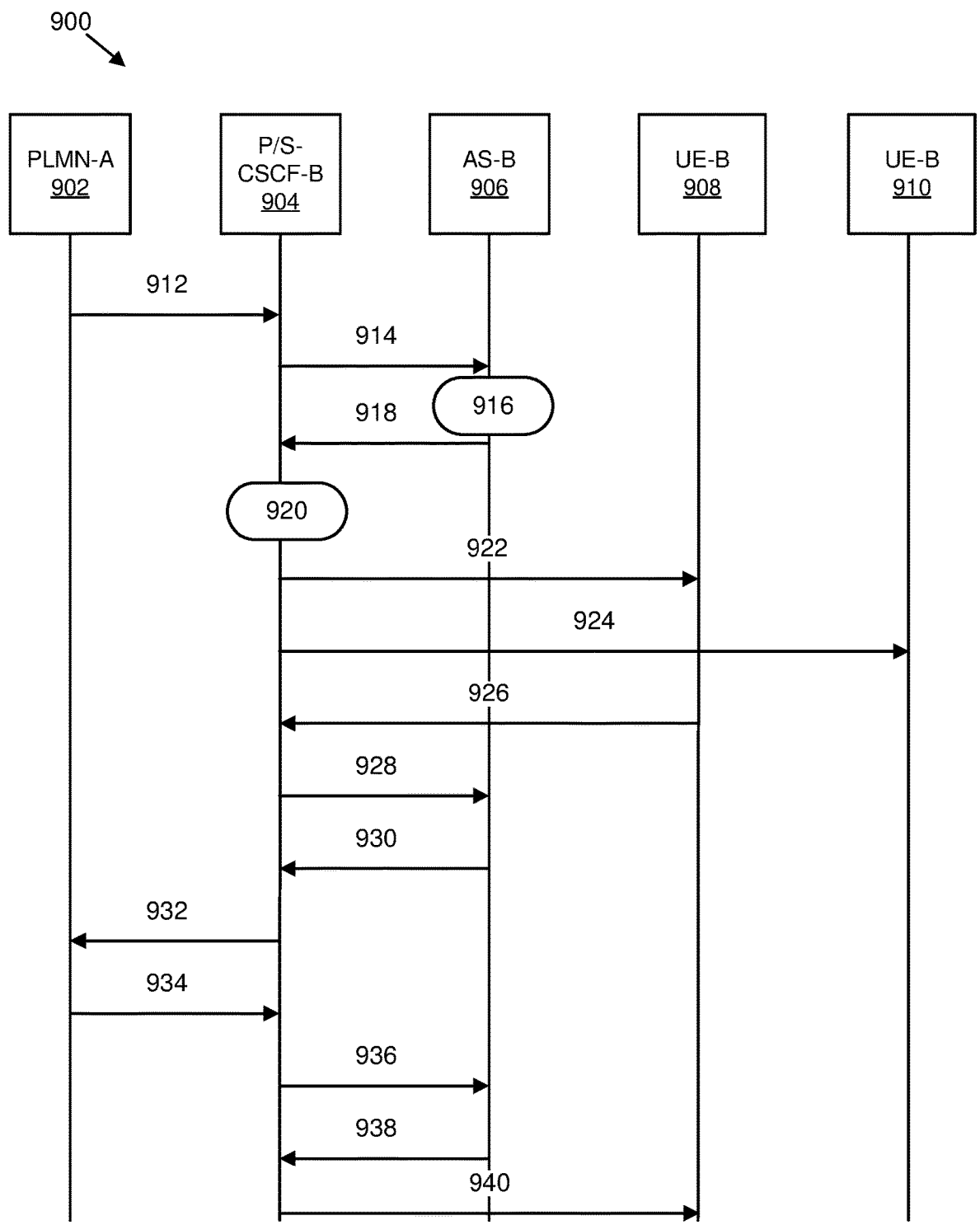
FIG. 9 is a schematic block diagram illustrating a further embodiment of communications in a system having a native UE.

An INVITE may be sent by UE-A towards UE-B as shown in FIG. 9. User B as shown has two devices registered for identity B against UE contact instance 1 and UE contact instance 2.

FIG. 9 is a schematic block diagram illustrating a further embodiment of communications in a system 900 having a native UE. Specifically, the system 900 includes a PLMN-A 902, a P/S-CSCF-B 904, an AS-B 906, a UE-B 908 (e.g., instance 1), and a UE-B 910 (e.g., instance 2). As may be appreciated, each of the communications in the system 900 may include one or more messages.

In a first communication 912, P/S-CSCF-B 904 receives a SIP INVITE from PLMN-A 902. The SIP INVITE request contains Request-URI identifying user B as B-native (e.g., including INVITE B; From: A; P-Preferred-Identity:A).

In a second communication 914, P/S-CSCF-B 904 forwards the SIP INVITE to the AS-B 906.

Upon receipt of the SIP INVITE request, the AS-B 906 determines 916 that the request is for UE-B 908 for which the identity B corresponds in Request-URI.

In a third communication 918, the AS-B 906 forwards the SIP INVITE request towards the P/S-CSCF-B 904.

UE-B 908 and UE-B 910 are registered 920 with the same contact but different instances, identities, and reg-ids. The instances of the contact have q-values q1 and q2 at the time of registration.

In a fourth communication 922 and a fifth communication 924, if the capability of UE contact instance 1 and UE contact instance 2 allow, the P/S-CSCF-B 904 may populate two SIP INVITE requests, one targeted to UE-B 908 registered for the UE contact instance 1 and with the P-Called-Part-ID header field set to B and the other one to UE-B 910 registered for the UE contact instance 1 and with the P-Called-Party-ID header field set to B is added as well. Due to q-values registered for the UE contact instance 1 and UE contact instance 2, the SIP INVITE may be sent towards the targets simultaneously or in different times. This may provide a forking functionality (e.g., the SIP INVITE request is sent towards both devices which may be simultaneously or at different times depending on the registered q-values for the instances of the contact). The q-values are between 0 and 1 a higher number indicating earlier transmissions than lower numbers. A certain q-value such as a zero value may be for not transmitting the SIP INVITE request towards the device with that zero q-value registered for the instance of the contact.

If the capability of UE contact instance 1 and UE contact instance 2 do not allow the session establishment, the P/S-CSCF-B 904 terminates the session establishment and sends a response with an appropriate error cause towards PLMN-A 902. UE-B 908 instance 1 or UE-B 910 instance 2 may have added a class set to business or methods other than INVITE to the contact header field at the time of registration. These capabilities may not match with the caller preference in the SIP INVITE request.

In a sixth communication 926, the UE-B 908 instance 1 sends SIP 200 (OK) response towards the P/S-CSCF-B 904.

In a seventh communication 928, the P/S-CSCF-B 904 forwards the SIP 200 (OK) response to the AS-B 906.

In an eighth communication 930, the AS-B 906 forwards the SIP 200 (OK) response to the P/S-CSCF-B 904.

In a ninth communication 932, the P/S-CSCF-B 904 forwards the SIP 200 OK response to the PLMN-A 902.

In a tenth communication 934, the P/S-CSCF-B 904 receives a SIP ACK request from the PLMN-A 902.

In an eleventh communication 936, the P/S-CSCF-B 904 forwards the SIP ACK request to the AS-B 906.

In a twelfth communication 938, the AS-B 906 forwards the SIP ACK request to the P/S-CSCF-B 904.

In a thirteenth communication 940, the P/S-CSCF-B 904 forwards the SIP ACK request to the UE-B 908 instance 1.

For non-native identities, an identity is from different IMSIs but the same IMS registration (e.g., alternative identity). The registrations may be according to FIG. 10.

Figure 10:
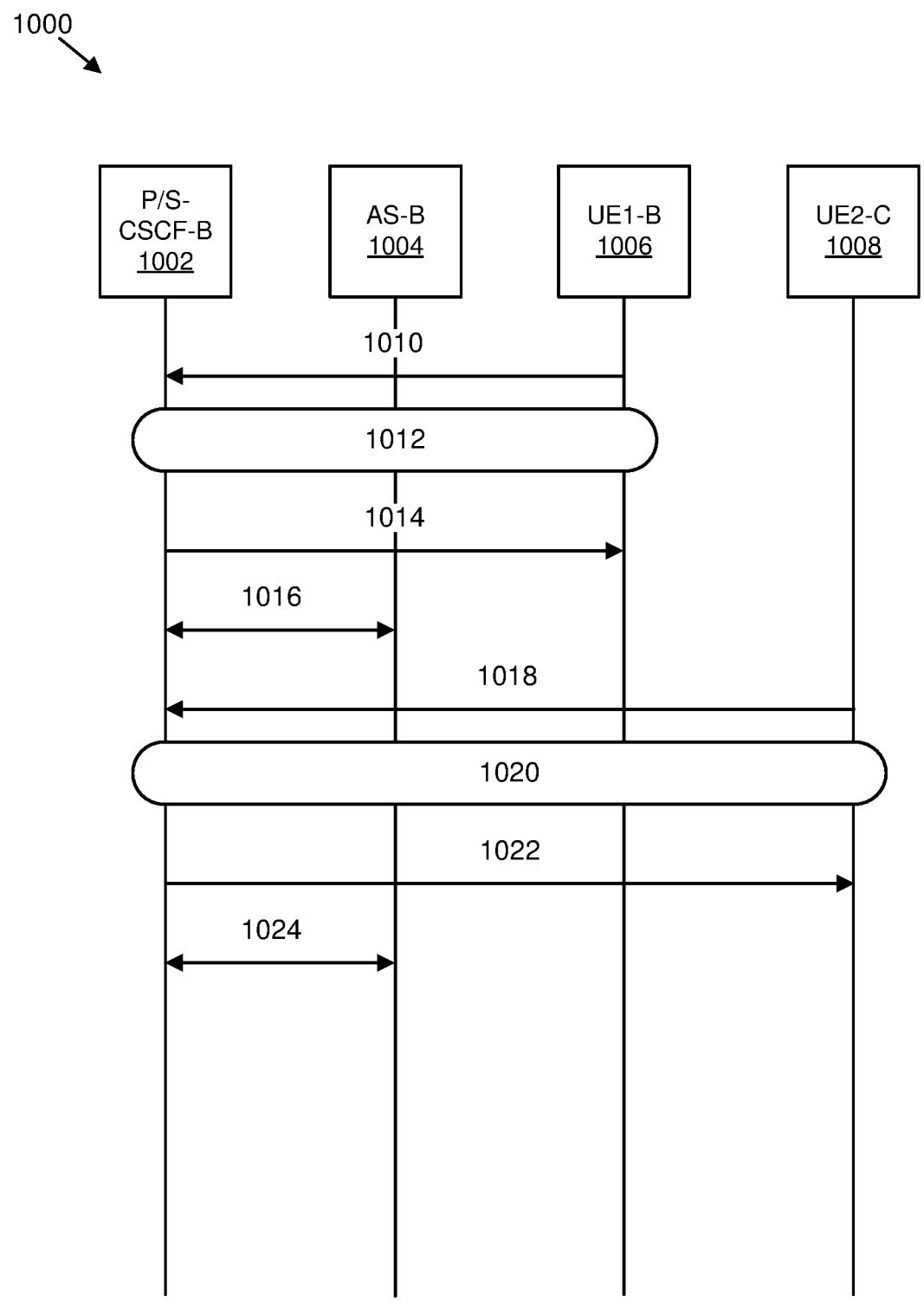
FIG. 10 is a schematic block diagram illustrating one embodiment of communications in a system having a non-native UE.

FIG. 10 is a schematic block diagram illustrating one embodiment of communications in a system having a non-native UE. Specifically, the system 1000 includes a P/S-CSCF-B 1002, an AS-B 1004, a UE1-B 1006, and a UE2-C 1008. As may be appreciated, each of the communications in the system 1000 may include one or more messages.

In a first communication 1010, the first device (UE1-B 1006) registers UE1 contact with the identity B. The registration may have an instance with an instance-id. If an instance of the UE1 contact is registered, then a registration identifier reg-id with an assigned number for this instance may also be chosen. The contact header field may have a q-value chosen to q1. The contact header field may also include some capabilities for this instance of the UE contact, such as methods and class (e.g., To: B; Contact: UE1 contact; q-value).

In a second communication 1012, the network may challenge the registration and if the authentication is successful, then in a third communication 1014, the P/S-CSCF-B 1002 (e.g., network) may send in the contact header of 200 OK to the UE1-B 1006, the contact, the q-value to confirm the requested q-value, identity C which can also be used by this UE1 contact and the expire parameter to indicate when the contact is expired. If the instance of the UE1 contact is registered then the 200 OK response include pub-gruu, temp-gruu and reg-id as well (e.g., To: B; Contact: UE1 contact; C; q-value; expires=3600).

In a fourth communication 1016, the P/S-CSCF-B 1002 performs 3rd party registration on behalf of the UE1-B 1006.

In a fifth communication 1018, the second device (UE2-C 1008) registers UE2 contact with the identity C. The registration may have an instance with an instance-id. If an instance of the UE1 contact is registered, then a registration identifier reg-id with an assigned number for this instance may also be chosen. The contact header field may have a q-value chosen to q2. The contact header field may also include some capabilities for the instance of the UE contact such as methods and class (e.g., To: C; Contact: UE2 contact; q-value).

In a sixth communication 1020, the network may challenge the registration, and if the authentication is successful, then in a seventh communication 1022, the P/S-CSCF-B 1002 (e.g., network) may send in the contact header of 200 OK, the contact, the q-value to confirm the requested q-value, identity B which can also be used by this UE2 contact and the expire parameter to indicate when the contact is expired. If the instance of the UE2 contact is registered then the 200 OK response include pub-gruu, temp-gruu and reg-id as well (e.g., To: C; Contact: UE2 contact; B; q-value; expires=3600).

In an eighth communication 1024, the P/S-CSCF-B 1002 performs 3rd party registration on behalf of the UE2-C 1008.

Figure 11:
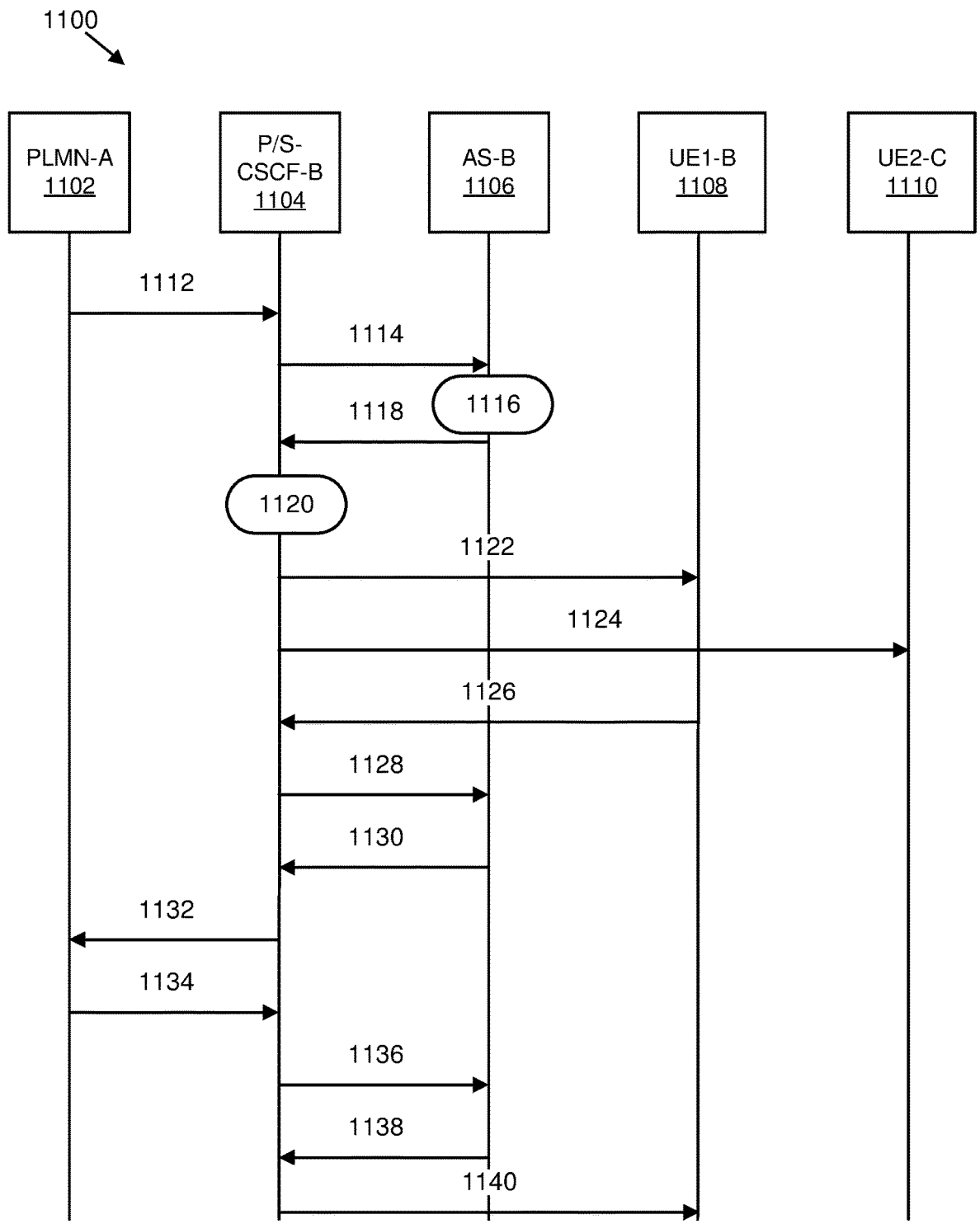
FIG. 11 is a schematic block diagram illustrating another embodiment of communications in a system having a non-native UE.

In some embodiments, an INVITE is sent by UE-A towards the UE with identity B shown in FIG. 11. User B as shown has two devices registered for identity B with UE1 contact and identity C with the UE2 contact. Instances of the UE1 contact and UE2 contact may be used for these identities and the behavior will be the same. The identities B and C are alternative identities.

FIG. 11 is a schematic block diagram illustrating another embodiment of communications in a system 1100 having a non-native UE. Specifically, the system 1100 includes a PLMN-A 1102, a P/S-CSCF-B 1104, an AS-B 1106, a UE1-B 1108, and a UE2-C 1110. As may be appreciated, each of the communications in the system 1100 may include one or more messages.

In a first communication 1112, P/S-CSCF-B 1104 receives a SIP INVITE from PLMN-A 1102. The SIP INVITE request contains Request-URI identifying user B with the alternative identity B (e.g., including INVITE B; From: A; P-Preferred-Identity:A).

In a second communication 1114, P/S-CSCF-B 1104 forwards the SIP INVITE to the AS-B 1106.

Upon receipt of the SIP INVITE request, the AS-B 1106 determines 1116 that the request is for UE1-B 1108 for which the identity B in Request-URI.

In a third communication 1118, the AS-B 1106 forwards the SIP INVITE request towards the P/S-CSCF-B 1104.

UE1-B 1108 and UE2-C 1110 are registered 1120 with different contacts, but the same identity (e.g., address-of-record ("AOR")). The instances of the contact have q-values q1 and q2 at the time of registration.

In a fourth communication 1122 and a fifth communication 1124, if the capability of UE1 contact allows, the P/S-CSCF-B 1104 may populate one SIP INVITE request by replacing the Request-URI with the UE1 contact with the registered identity B and send the SIP INVITE request only to UE1 contact (e.g., UE1-B 1108). The P/S-CSCF-B 1104 may add the P-Called-Party-ID header field is set to identity B to the SIP INVITE request.

If the capability of UE1 contact and UE2 contact allow, the P/S-CSCF-B 1104 may behave by populating two SIP INVITE requests, one targeted to UE1-B 1108 registered for the UE1 contact with the P-Called-Part-ID header field set to B is added and the other one to UE2-C 1110 registered for the UE2 contact and with the P-Called-Party-ID header field set to B is added as well. This behavior may be due to the fact that both B and C identities are associated identities as alternative identities which are registered for the UE1 contact and the UE2-contact. Due to q-values registered for the UE1 contact and UE2 contact, the SIP INVITE may be sent towards the targets simultaneously or in different times. This may provide a forking functionality (e.g., the SIP INVITE request is sent towards both devices which may be simultaneously or at different times depending on the registered q-values for the contact). The q-values are between 0 and 1 a higher number indicating earlier transmissions than lower numbers. A certain q-value, such as a zero value, may be for not transmitting the SIP INVITE request towards the device with that zero q-value registered for the contact.

If the capability of UE1 contact and UE2 contact do not allow the session establishment, the P/S-CSCF-B 1104 terminates the session establishment and sends a response with an appropriate error cause towards PLMN-A 1102. UE1-B 1108 or UE1-C 1110 may have added a class set to business or methods other than INVITE to the contact header field at the time of registration. These capabilities may not match with the caller preference in the SIP INVITE request.

In a sixth communication 1126, the UE1-B 1108 instance 1 sends SIP 200 (OK) response towards the P/S-CSCF-B 1104.

In a seventh communication 1128, the P/S-CSCF-B 1104 forwards the SIP 200 (OK) response to the AS-B 1106.

In an eighth communication 1130, the AS-B 1106 forwards the SIP 200 (OK) response to the P/S-CSCF-B 1104.

In a ninth communication 1132, the P/S-CSCF-B 1104 forwards the SIP 200 OK response to the PLMN-A 1102.

In a tenth communication 1134, the P/S-CSCF-B 1104 receives a SIP ACK request from the PLMN-A 1102.

In an eleventh communication 1136, the P/S-CSCF-B 1104 forwards the SIP ACK request to the AS-B 1106.

In a twelfth communication 1138, the AS-B 1106 forwards the SIP ACK request to the P/S-CSCF-B 1104.

In a thirteenth communication 1140, the P/S-CSCF-B 1104 forwards the SIP ACK request to the UE1-B 1108.

Figure 12:
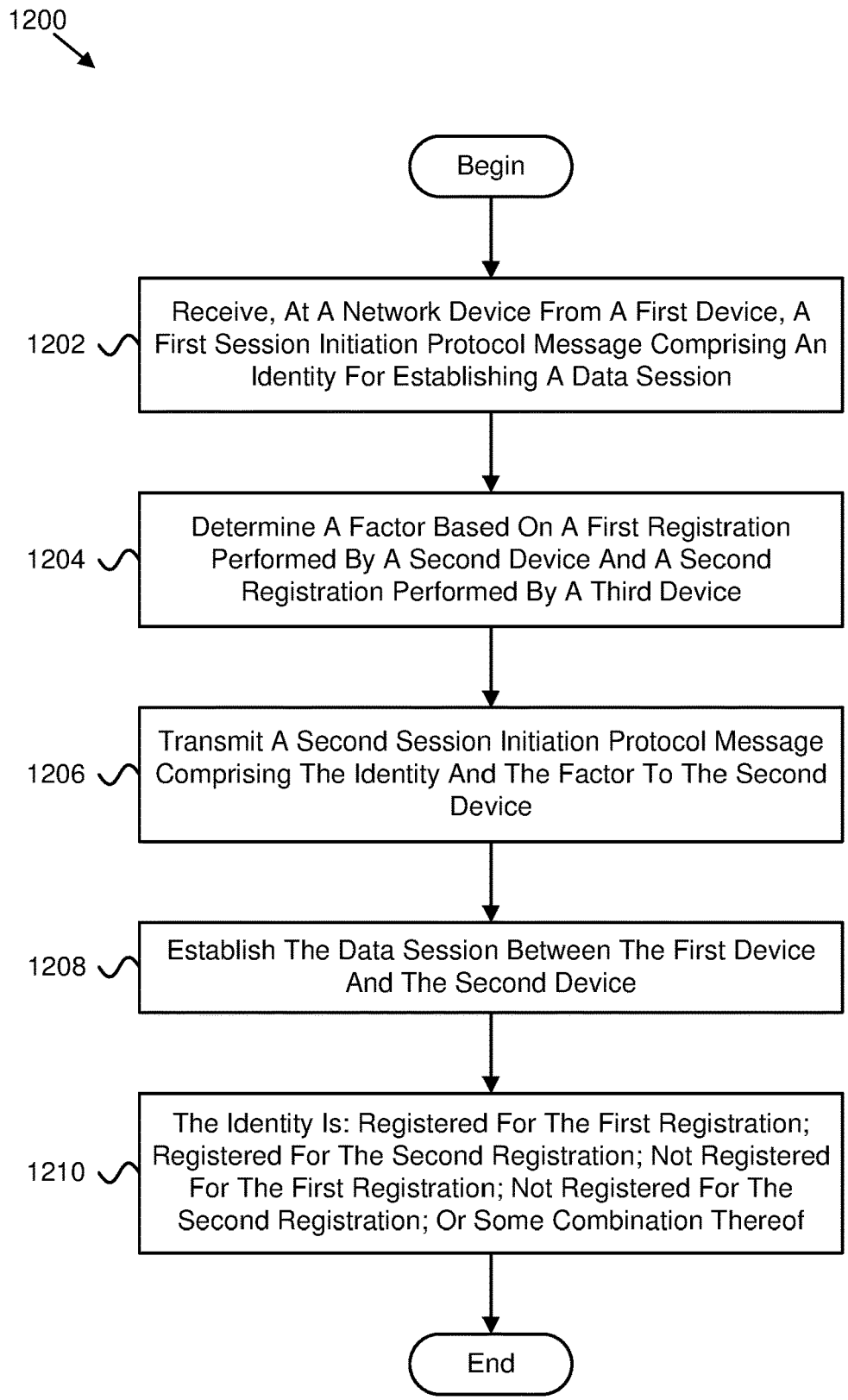
FIG. 12 is a flow chart diagram illustrating one embodiment of a method for a factor for multiple device registrations.

FIG. 12 is a flow chart diagram illustrating one embodiment of a method 1200 for a factor for multiple device registrations. In some embodiments, the method 1200 is performed by an apparatus, such as the network unit 104. In certain embodiments, the method 1200 may be to performed by a processor executing program code, for example, a microcontroller, a microprocessor, a CPU, a GPU, an auxiliary processing unit, a FPGA, or the like.

In various embodiments, the method 1200 includes receiving 1202, at a network device from a first device, a first session initiation protocol message including an identity for establishing a data session. In some embodiments, the method 1200 includes determining 1204 a factor based on a first registration performed by a second device and a second registration performed by a third device. In certain embodiments, the method 1200 includes transmitting 1206 a second session initiation protocol message including the identity and the factor to the second device. In various embodiments, the method 1200 includes establishing 1208 the data session between the first device and the second device. In some embodiments, the identity is 1210: registered for the first registration; registered for the second registration; not registered for the first registration; not registered for the second registration; or some combination thereof.

In certain embodiments, the first registration comprises registration of a first value of the second device, and the first value indicates a desire for establishment of the data session with the second device. In some embodiments, the second registration comprises registration of a second value of the third device, and the second value indicates a desire for establishment of the data session with the third device. In various embodiments, the first registration comprises registration of capabilities of the second device.

In one embodiment, the second registration comprises registration of capabilities of the third device. In certain embodiments, the first session initiation protocol message comprises a property of the first registration. In some embodiments, the second device has a first instance of a contact and the third device has a second instance of the contact.

In various embodiments, the second device has a first contact and the third device has a second contact. In one embodiment, the first session initiation protocol message comprises a preference from the first device for establishing the data session, and the factor is determined based on the preference. In certain embodiments, the second device and the third device are identified by the identity.

In some embodiments, the identity is received in a P-Called-Party-ID header field. In various embodiments, the factor comprises a q-value.

Figure 13:
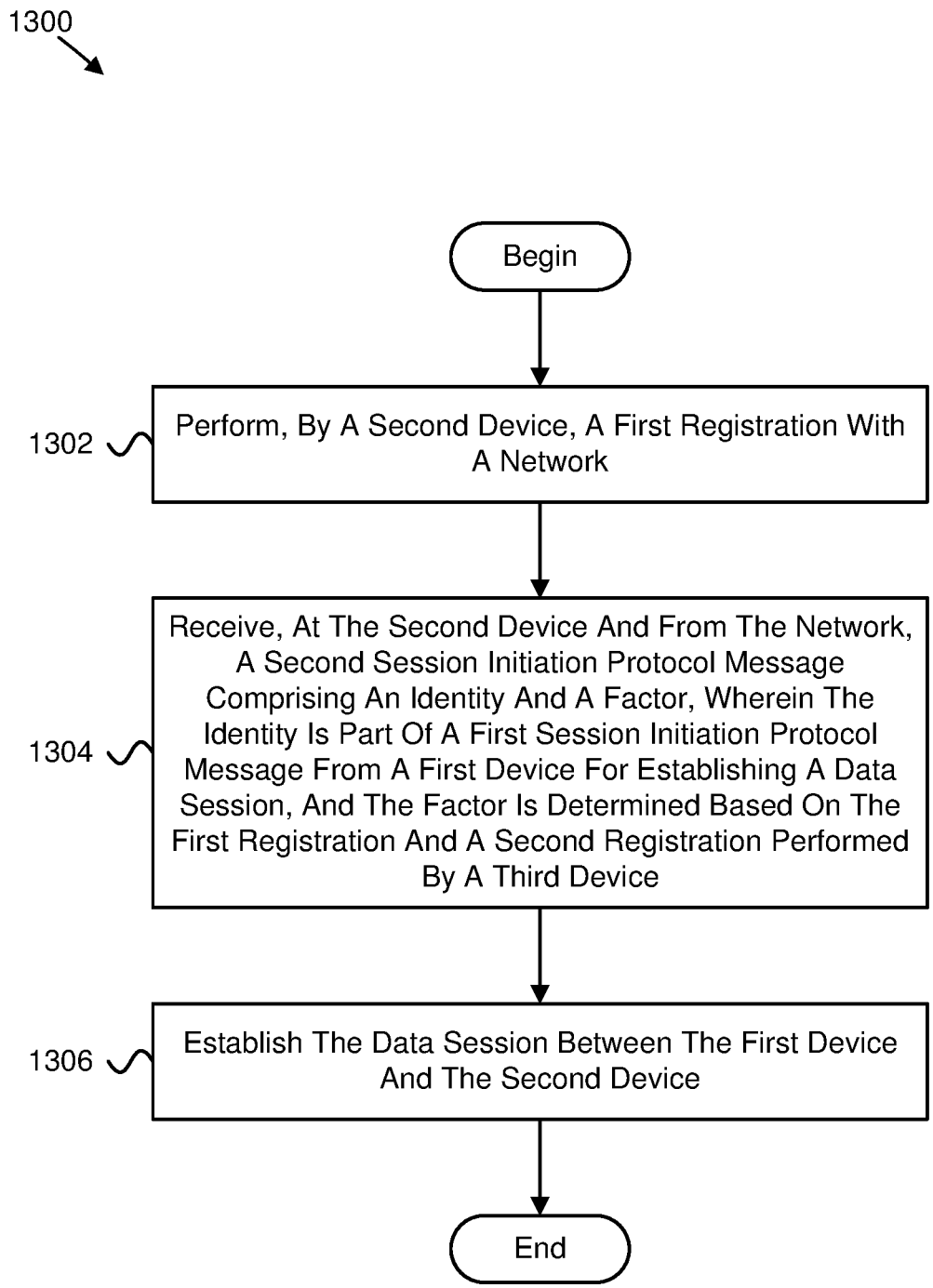
FIG. 13 is a flow chart diagram illustrating another embodiment of a method for a factor for multiple device registrations.

FIG. 13 is a flow chart diagram illustrating one embodiment of a method 1300 for a factor for multiple device registrations. In some embodiments, the method 1300 is performed by an apparatus, such as the network unit 104. In certain embodiments, the method 1300 may be performed by a processor executing program code, for example, a microcontroller, a microprocessor, a CPU, a GPU, an auxiliary processing unit, a FPGA, or the like.

In various embodiments, the method 1300 includes performing 1302, by a second device, a first registration with a network. In some embodiments, the method 1300 includes receiving 1304, at the second device and from the network, a second session initiation protocol message including an identity and a factor. The identity is part of a first session initiation protocol message from a first device for establishing a data session, and the factor is determined based on the first registration and a second registration performed by a third device. In certain embodiments, the method 1300 includes establishing 1306 the data session between the first device and the second device.

In certain embodiments, the first registration comprises registration of a first value of the second device, and the first value indicates a desire for establishment of the data session with the second device. In some embodiments, the second registration comprises registration of a second value of the third device, and the second value indicates a desire for establishment of the data session with the third device. In various embodiments, the first registration comprises registration of capabilities of the second device.

In one embodiment, the second registration comprises registration of capabilities of the third device. In certain embodiments, the first session initiation protocol message comprises a property of the first registration. In some embodiments, the second device has a first instance of a contact and the third device has a second instance of the contact.

In various embodiments, the second device has a first contact and the third device has a second contact. In one embodiment, the first session initiation protocol message comprises a preference from the first device for establishing the data session, and the factor is determined based on the preference. In certain embodiments, the second device and the third device are identified by the identity.

In some embodiments, the identity is received in a P-Called-Party-ID header field. In various embodiments, the factor comprises a q-value.

In one embodiment, a method comprises: receiving, at a network device from a first device, a first session initiation protocol message comprising an identity for establishing a data session; determining a factor based on a first registration performed by a second device and a second registration performed by a third device; transmitting a second session initiation protocol message comprising the identity and the factor to the second device; and establishing the data session between the first device and the second device; wherein the identity is: registered for the first registration; registered for the second registration; not registered for the first registration; not registered for the second registration; or some combination thereof.

In certain embodiments, the first registration comprises registration of a first value of the second device, and the first value indicates a desire for establishment of the data session with the second device.

In some embodiments, the second registration comprises registration of a second value of the third device, and the second value indicates a desire for establishment of the data session with the third device.

In various embodiments, the first registration comprises registration of capabilities of the second device.

In one embodiment, the second registration comprises registration of capabilities of the third device.

In certain embodiments, the first session initiation protocol message comprises a property of the first registration.

In some embodiments, the second device has a first instance of a contact and the third device has a second instance of the contact.

In various embodiments, the second device has a first contact and the third device has a second contact.

In one embodiment, the first session initiation protocol message comprises a preference from the first device for establishing the data session, and the factor is determined based on the preference.

In certain embodiments, the second device and the third device are identified by the identity.

In some embodiments, the identity is received in a P-Called-Party-ID header field.

In various embodiments, the factor comprises a q-value.

In one embodiment, an apparatus comprises a network device. The apparatus further comprises: a receiver that receives, from a first device, a first session initiation protocol message comprising an identity for establishing a data session; a processor that determines a factor based on a first registration performed by a second device and a second registration performed by a third device; and a transmitter that transmits a second session initiation protocol message comprising the identity and the factor to the second device; wherein the processor establishes the data session between the first device and the second device; and wherein the identity is: registered for the first registration; registered for the second registration; not registered for the first registration; not registered for the second registration; or some combination thereof.

In certain embodiments, the first registration comprises registration of a first value of the second device, and the first value indicates a desire for establishment of the data session with the second device.

In some embodiments, the second registration comprises registration of a second value of the third device, and the second value indicates a desire for establishment of the data session with the third device.

In various embodiments, the first registration comprises registration of capabilities of the second device.

In one embodiment, the second registration comprises registration of capabilities of the third device.

In certain embodiments, the first session initiation protocol message comprises a property of the first registration.

In some embodiments, the second device has a first instance of a contact and the third device has a second instance of the contact.

In various embodiments, the second device has a first contact and the third device has a second contact.

In one embodiment, the first session initiation protocol message comprises a preference from the first device for establishing the data session, and the factor is determined based on the preference.

In certain embodiments, the second device and the third device are identified by the identity.

In some embodiments, the identity is received in a P-Called-Party-ID header field.

In various embodiments, the factor comprises a q-value.

In one embodiment, a method comprises: performing, by a second device, a first registration with a network; receiving, at the second device and from the network, a second session initiation protocol message comprising an identity and a factor, wherein the identity is part of a first session initiation protocol message from a first device for establishing a data session, and the factor is determined based on the first registration and a second registration performed by a third device; and establishing the data session between the first device and the second device.

In certain embodiments, the first registration comprises registration of a first value of the second device, and the first value indicates a desire for establishment of the data session with the second device.

In some embodiments, the second registration comprises registration of a second value of the third device, and the second value indicates a desire for establishment of the data session with the third device.

In various embodiments, the first registration comprises registration of capabilities of the second device.

In one embodiment, the second registration comprises registration of capabilities of the third device.

In certain embodiments, the first session initiation protocol message comprises a property of the first registration.

In some embodiments, the second device has a first instance of a contact and the third device has a second instance of the contact.

In various embodiments, the second device has a first contact and the third device has a second contact.

In one embodiment, the first session initiation protocol message comprises a preference from the first device for establishing the data session, and the factor is determined based on the preference.

In certain embodiments, the second device and the third device are identified by the identity.

In some embodiments, the identity is received in a P-Called-Party-ID header field.

In various embodiments, the factor comprises a q-value.

In one embodiment, an apparatus comprises a second device. The apparatus further comprises: a processor that performs a first registration with a network; and a receiver that receives, from the network, a second session initiation protocol message comprising an identity and a factor, wherein the identity is part of a first session initiation protocol message from a first device for establishing a data session, and the factor is determined based on the first registration and a second registration performed by a third device; wherein the processor establishes the data session between the first device and the second device.

In certain embodiments, the first registration comprises registration of a first value of the second device, and the first value indicates a desire for establishment of the data session with the second device.

In some embodiments, the second registration comprises registration of a second value of the third device, and the second value indicates a desire for establishment of the data session with the third device.

In various embodiments, the first registration comprises registration of capabilities of the second device.

In one embodiment, the second registration comprises registration of capabilities of the third device.

In certain embodiments, the first session initiation protocol message comprises a property of the first registration.

In some embodiments, the second device has a first instance of a contact and the third device has a second instance of the contact.

In various embodiments, the second device has a first contact and the third device has a second contact.

In one embodiment, the first session initiation protocol message comprises a preference from the first device for establishing the data session, and the factor is determined based on the preference.

In certain embodiments, the second device and the third device are identified by the identity.

In some embodiments, the identity is received in a P-Called-Party-ID header field.

In various embodiments, the factor comprises a q-value.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method for performing a network function, the method comprising:
    receiving, from a first device, a first session initiation protocol message comprising an identity for establishing a data session, wherein the identity is received in a P-Called-Party-ID header field;
    determining a factor based on a first registration performed by a second device and a second registration performed by a third device;
    transmitting a second session initiation protocol message comprising the identity and the factor to the second device; and
    establishing the data session between the first device and the second device;
    wherein the identity is one or more of: registered for the first registration; registered for the second registration; not registered for the first registration; or not registered for the second registration.

2. An apparatus for performing a network function, the apparatus comprising:
    at least one memory; and
    at least one processor coupled with the at least one memory and configured to cause the apparatus to:
        receive, from a first device, a first session initiation protocol message comprising an identity for establishing a data session, wherein the identity is received in a P-Called-Party-ID header field;
        determine a factor based on a first registration performed by a second device and a second registration performed by a third device;
        transmit a second session initiation protocol message comprising the identity and the factor to the second device; and
        establish the data session between the first device and the second device;
        wherein the identity is one or more of: registered for the first registration; registered for the second registration; not registered for the first registration; or not registered for the second registration.

3. The apparatus of claim 2, wherein the first registration comprises registration of a first value of the second device, and the first value indicates a desire for establishment of the data session with the second device.

4. The apparatus of claim 2, wherein the second registration comprises registration of a second value of the third device, and the second value indicates a desire for establishment of the data session with the third device.

5. The apparatus of claim 2, wherein the first registration comprises registration of capabilities of the second device.

6. The apparatus of claim 2, wherein the second registration comprises registration of capabilities of the third device.

7. The apparatus of claim 2, wherein the first session initiation protocol message comprises a property of the first registration.

8. The apparatus of claim 2, wherein the second device has a first instance of a contact and the third device has a second instance of the contact.

9. The apparatus of claim 2, wherein the second device has a first contact and the third device has a second contact.

10. The apparatus of claim 2, wherein the first session initiation protocol message comprises a preference from the first device for establishing the data session, and the factor is determined based on the preference.

11. The apparatus of claim 2, wherein the second device and the third device are identified by the identity.

12. The apparatus of claim 2, wherein the factor comprises a q-value.

13. A user equipment (UE), comprising:
    at least one memory; and
    at least one processor coupled with the at least one memory and configured to cause the UE to:
        perform a first registration with a network; and
        receive, from the network, a second session initiation protocol message comprising an identity and a factor, wherein the identity is received in a P-Called-Party-ID header field, and wherein the identity is:
            part of a first session initiation protocol message from a first device for establishing a data session; and
            registered for the first registration; or
            not registered for the first registration; and
        wherein the factor is determined based on the first registration and a second registration performed by a third device;
        wherein the factor prioritizes the first registration and the processor establishes the data session between the first device and the UE apparatus.

14. The UE of claim 13, wherein the first registration comprises registration of a first value of the UE, and the first value indicates a desire for establishment of the data session with the UE.

15. The UE of claim 13, wherein the second registration comprises registration of a second value of the third device, and the second value indicates a desire for establishment of the data session with the third device.

16. The UE of claim 13, wherein the first registration comprises registration of capabilities of the UE.

17. The UE of claim 13, wherein the second registration comprises registration of capabilities of the third device.

18. The UE of claim 13, wherein the first session initiation protocol message comprises a property of the first registration.

19. The UE of claim 13, wherein the UE has a first instance of a contact and the third device has a second instance of the contact.

* * * * *